United States Patent [19]

Miyazaki

[11] Patent Number: 5,025,709
[45] Date of Patent: Jun. 25, 1991

[54] TANDEM TYPE VACUUM BOOSTER

[75] Inventor: Yoshihisa Miyazaki, Nagano, Japan

[73] Assignee: Nissin Kogyo Kabushiki Kaisha, Ueda, Japan

[21] Appl. No.: 527,918

[22] Filed: May 24, 1990

[30] Foreign Application Priority Data

Aug. 8, 1989 [JP] Japan .................... 1-93080[U]

[51] Int. Cl.⁵ .................................. F01B 19/00
[52] U.S. Cl. .............................. 92/48; 92/98 R; 92/98 D; 92/128; 92/169.1; 403/348; 403/13
[58] Field of Search ............ 92/48, 98 R, 98 D, 96, 92/128, 169.1; 403/348, 349, 13, 14

[56] References Cited

U.S. PATENT DOCUMENTS

| | | | |
|---|---|---|---|
| 4,567,812 | 2/1986 | Weiler et al. | 403/349 |
| 4,569,276 | 2/1986 | Kytta | 92/169.1 |
| 4,594,854 | 6/1986 | Takeuchi et al. | 92/128 |
| 4,596,178 | 6/1986 | Sugiura | 92/169.1 |
| 4,604,944 | 8/1986 | Tsubouchi | 92/98 D |
| 4,790,235 | 12/1988 | Gautier et al. | 403/348 |
| 4,811,653 | 3/1989 | Kobayashi | 92/98 D |

FOREIGN PATENT DOCUMENTS

| | | | |
|---|---|---|---|
| 1393529 | 5/1975 | United Kingdom | 92/48 |
| 2127504 | 4/1984 | United Kingdom | 92/169.1 |

Primary Examiner—John T. Kwon
Assistant Examiner—Thomas Denion
Attorney, Agent, or Firm—Armstrong, Nikaido, Marmelstein, Kubovcik & Murray

[57] ABSTRACT

In a tandem type vacuum booster, the booster comprises a first and a second flange, and the second flange is formed with a first stop projection and a second stop projection, the first stop projection being adapted to abut against a predetermined one of the locking claw to stop the flanges at the assembled position before the locking claws interfere with a positioning means during rotation of the flanges to the assembled position, and the second stop projection permitting passing thereover of a locking claw other than the predetermined locking claw during rotation of the flanges toward the assembled position, but coming into abutment against such other locking claw to resist the rotation of the flanges back to the disassembled position when the flanges have reached the assembled position. This ensures that the positioning means for the flanges of the partition wall plate and the rear shell half cannot be deformed during assembling of the booster, and this also makes it possible to stop the flanges at the predetermined assembled position. Further, even after assembling, the relative idle movement of the two shell halves can be prevented to maintain the flanges at the assembled position.

4 Claims, 5 Drawing Sheets

TANDEM TYPE VACUUM BOOSTER

BACKGROUND OF THE INVENTION

1. Field of the Invention

The field of the present invention is tandem type vacuum boosters for boostingly operating a master cylinder for a brake of an automobile and the like by a vacuum pressure, and more particularly, is improvements of such tandem type vacuum boosters comprising a booster shell which is comprised of a front shell half formed into a bottomed cylindrical shape with a rear end thereof opened, a rear shell half which closes the opened end of the front shell half, and a partition wall plate clamped between both the shell halves for dividing a chamber between both the shell halves into a front shell chamber and a rear shell chamber; a front diaphragm having an outer peripheral bead clamped between the front shell half and the partition wall plate; and a rear diaphragm having an outer peripheral bead clamped between the partition wall plate and the rear shell half; the front shell half being provided at its rear end with an annular radially outwardly extending step and a cylindrical portion extending rearwardly from an outer periphery of the step, the partition wall plate and the rear shell half having a first and a second flange provided thereon respectively, which flanges are superposed one on another within the cylindrical portion and rotatable between a disassembled position and an assembled position, each of the flanges having a number of notches circumferentially arranged along a peripheral edge thereof, the flanges being connected to each other through positioning means so that their notches are aligned with each other, the cylindrical portion being provided with a number of locking claws which are aligned with the notches in the disassembled position of the flanges to enable engagement and disengagement of the flanges with and from the cylindrical portion and which clamp the flanges to the step in the assembled position.

2. Description of the Prior Art

Such tandem type vacuum boosters are already known, for example, as disclosed in Japanese Utility Model Publication No. 31330/87 and Japanese Utility Model Application Laid-open No. 157361/85.

The tandem type vacuum booster described in Japanese Utility Model Publication No. 31330/87 is designed so that the positioning means for connecting the flanges of the partition wall plate and the rear shell half also serves as stop means which adapted to abut against the locking claw upon rotation of the flanges to the assembled position to stop the flanges at the assembled position. With the booster of such a construction, the positioning means may be deformed in some cases by reception of a large load from the locking claw in the assembled position, and such deformation may bring about a misalignment in relative positional relation between both the flanges, resulting in an interference with the subsequent disassembling and reassembling. The tandem type vacuum booster described in Japanese Utility Model Application Laid-open No. 157361/85 is designed so that such the positioning means for the flanges of the partition wall plate and the rear shell half would not be interfered with the locking claws and may be thereby prevented from being deformed. With such booster, it is difficult to stop the flanges at an appropriate assembled position when the flanges have been rotated relative to the cylindrical portion of the front shell half during assembling.

SUMMARY OF THE INVENTION

The present invention has been accomplished with such circumstances in view, and it is an object of the present invention to provide a tandem type vacuum booster of the type described above, wherein the flanges can be stopped at a predetermined assembling position during assembling without any deformation of the positioning means for the flanges of the partition wall plate and the rear shell half, and moreover, even after assembling, the relative idle movement of the shell halves can be prevented to ensure that the flanges can be maintained at a predetermined assembled position.

To achieve the above object, according to the present invention, there is provided a tandem type vacuum booster, wherein the booster comprises a first and a second flange, and the second flange is formed with a first stop projection and a second stop projection, the first stop projection being adapted to abut against a predetermined one of the locking claws to stop the flanges at the assembled position before the locking claws interfere with the positioning means during rotation of the flanges to the assembled position, and the second stop projection permitting passing thereover of a locking claw other than the predetermined locking claw during rotation of the flanges toward the assembled position, but coming into abutment against such other locking claw to resist the rotation of the flanges back to the disassembled position when the flanges have reached the assembled position.

With the above construction, in assembling of the booster shell, it is possible to maintain the rear shell half at the predetermined assembled position, while avoiding any interference between the positioning means of the first and second flanges and the locking claws, by the abutment of the predetermined locking claw against the first stop projection.

In addition, after assembling, the abutment of another locking claw against the second stop projection provides a resistance to the rotation of the rear shell half back to the disassembled position and hence, the flanges, even if being subjected to a vibration, can be prevented from being displaced from the assembled position.

Moreover, the locking claws adapted to abut against the first and second stop projections are independently established and therefore, even if a certain locking claw is subjected to a slight deformation from the second stop projection during assembling or disassembling, the proper assembled position can be revived by the abutment of another non-deformed locking claw against the first stop projection during reassembling.

The above and other objects, features and advantages of the invention will become apparent from a reading of the following detailed description of the preferred embodiment, taken in conjunction with the accompanying drawings.

BRIEF DESCRIPTION OF THE DRAWINGS

Drawings illustrate one embodiment of the present invention, wherein.

DESCRIPTION OF THE PREFERRED EMBODIMENTS

One embodiment of the present invention will now be described with reference to the accompanying drawings.

Figure 1:
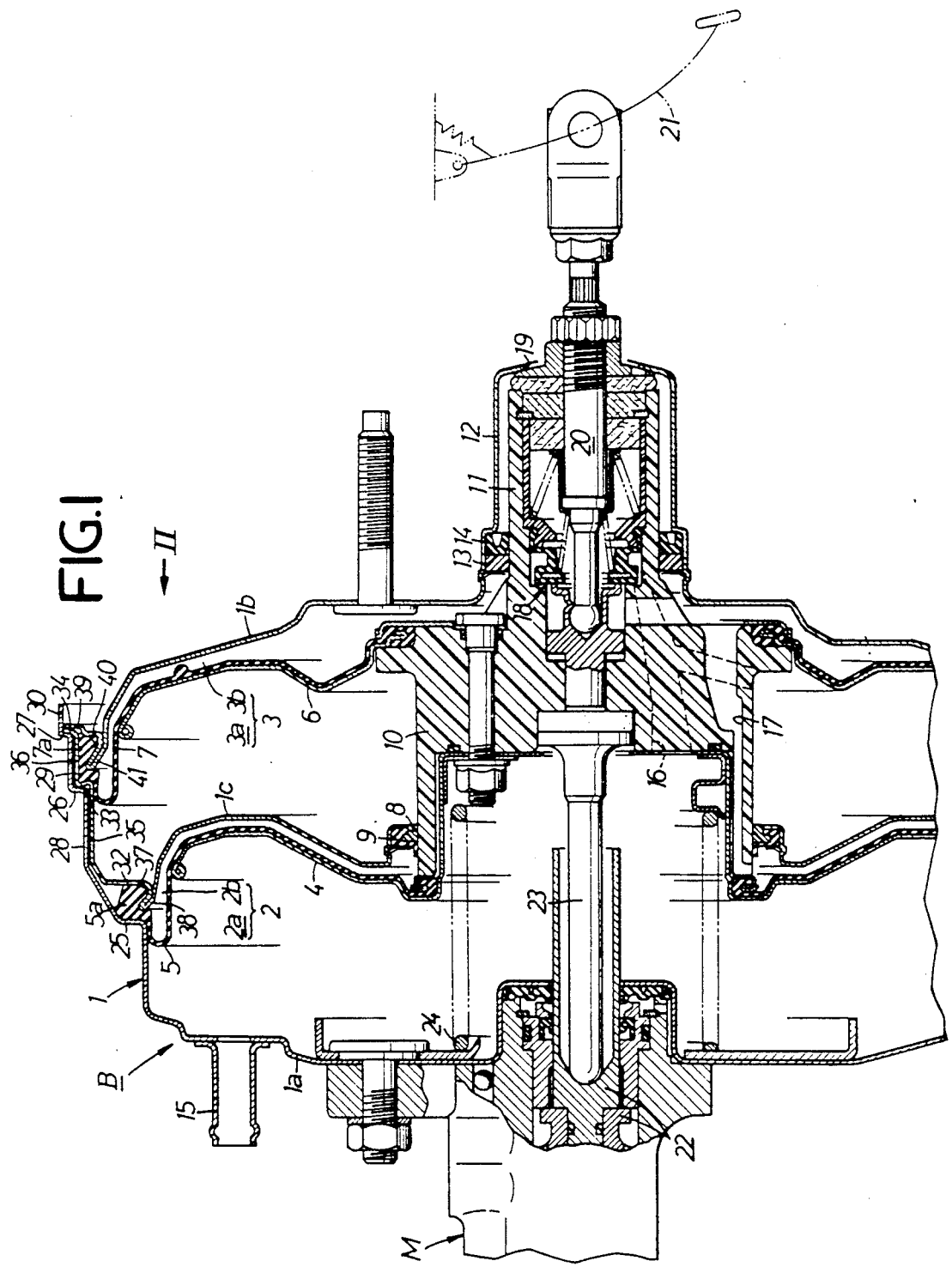
FIG. 1 is a side view in longitudinal section of a tandem type vacuum booster.

Referring to FIG. 1, a booster shell 1 of a tandem type vacuum booster B comprises a pair of front and rear shell halves 1a and 1b coupled at their opposed ends to each other, and a partition wall plate 1c which is clamped between both the shell halves 1a and 1b to divide a chamber between both the shell halves 1a and 1b into a front shell chamber 2 and a rear shell chamber 3. A brake master cylinder M is attached to a front face of the front shell half 1a, and the rear shell half 1b is secured to a vehicle body which is no shown.

The front shell chamber 2 is divided into a foreside front vacuum chamber 2a and a backside front working chamber 2b by a front booster piston 4 longitudinally reciprocatably received in the front shell chamber 2 and by a front diaphragm 5 superposed on and coupled to a rear face of the piston 4 and clamped between the front shell half 1a and the partition wall plate 1c. The rear shell chamber 3 is also divided into a foreside rear vacuum chamber 3a and a backside rear working chamber 3b by a rear booster piston 6 longitudinally reciprocatably received in the rear shell chamber 3 and by a rear diaphragm 7 superposed on and coupled to a rear face of the piston 6 and clamped together with the partition wall plate 1c between both the shell halves 1a and 1b.

The front and rear booster pistons 4 and 6 are annularly formed from a steel sheet and secured respectively to opposite front and rear ends of a piston boss 10 which is made of a synthetic resin and is slidably carried on a partition wall plate 1c with a bush 8 and a sealing member 9 interposed therebetween. Thus, the booster pistons 4 and 6 are integrally connected to each other through the piston boss 10.

The piston boss 10 has a valve cylinder 11 integrally provided at its rear end to project therefrom. The valve cylinder 11 is slidably carried through a bush 13 and a sealing member 14 on a cylindrical rearwardly extending part 12 which is projectingly mounted on a rear wall of the booster shell 1 to cover the valve cylinder 11.

The front vacuum chamber 2a is connected through a vacuum pressure introducing pipe 15 to a vacuum pressure source which is not shown (e.g., an interior of an intake manifold in an internal combustion engine) and communicates with a rear vacuum chamber 3a through a first port 16 in the piston boss 10. The front and rear working chambers 2b and 3b communicate with each other through a second port 17 in the piston boss 10 and adapted to be alternately put into communication with the front and rear vacuum chambers 2a and 3a and with an atmospheric air inlet port 19 opened in an end wall of the cylindrical rearwardly extending part 12 by the operation of a control valve 18 provided in the valve cylinder 11. The control valve 18 is a known valve operated by a brake pedal 21 through an input rod 20.

An output rod 23 is mounted on the piston boss 10 to project forwardly therefrom and is connected to a rear end of the piston 22 of the master cylinder M. A return spring 24 is provided in compression in the front vacuum chamber 2a for biasing the piston boss 10 in a retreating direction.

Thus, when the input rod 20 is allowed to advance by depression of the brake pedal 21, the working chambers 2b and 3b are put out of communication with the vacuum chambers 2a and 3a and with the atmospheric air inlet port 19 by the operation of the control valve 18, so that the atmospheric pressure acts on the working chambers 2b and 3b. A great difference in air pressure developed between the vacuum chambers 2a and 3a and the working chambers 2b and 3b causes the booster pistons 4 and 6 to advance, thereby permitting the piston 22 of the master cylinder M to be boostingly operated through the output rod 23. If the brake pedal 21 is released to permit the retreating of the input rod 20, the working chambers 2b and 3b are put out of communication with the atmospheric air inlet port 19 and into communication with the vacuum chambers 2a and 3a by the operation of the control valve 18, so that the difference in air pressure between the working chambers 2b and 3b and the vacuum chambers 2a and 3a decreases and hence, the booster pistons 4 and 6 can be retreated by a force of the return spring 24.

Description will now be made of a coupled structure of the front and rear shell halves 1a and 1b and the partition wall plate 1c.

The front shell half 1a is formed into a bottomed cylindrical shape with its rear end opened, and is provided, at its central portion, its rearwardly intermediate portion and its rear end, with first, second and third annular radially outwardly extending steps 25, 26 and 27 and first, second and third cylindrical portions 28, 29 and 30 extending rearwardly from outer peripheral ends of these steps, respectively. The cylindrical portions are formed such that rearer one has a larger diameter.

The partition wall plate 1c is formed with fourth and fifth annular steps 32 and 33 opposed respectively to the first and second steps 25 and 26 within the shell half 1a, a first flange 34 abutting against the third step 27, and fifth and sixth cylindrical portions 35 and 36 fitted respectively in the first and second cylindrical portions 28 and 29.

Further, the partition wall plate 1c has a locking projection 38 formed thereon in a bent manner and protruding diagonally and forwardly from an inner peripheral edge of the fourth step 32 to define an annular groove 37 between the projection 38 itself and fourth step 32. A leading end of the locking projection 38 is opposed to the first step 25 at a given distance. An outer peripheral bead 5a of the front diaphragm 5 is mounted in the annular groove 37, with its base portion clamped between the first step 25 and the locking projection 38.

The fifth step 33 is in proximity to the second step 26 to an extent that it is not in contact with the second step.

On the other hand, the rear shell half 1b is dish-shaped with an front end opened and is formed with a second flange 39 superposed on to a back of the first flange 34, and a locking projection 41 protruding diagonally and forwardly from a peripheral edge of the second flange 39 to define an annular groove 40 between the projection 41 itself and the second flange 39. A leading end of the locking projection 41 is opposed to the fifth step 33 at a given distance. An outer peripheral bead 7a of the rear diaphragm 7 is mounted in the annular groove 40, with its base portion clamped between the fifth step 33 and the locking projection 41.

Figure 2:
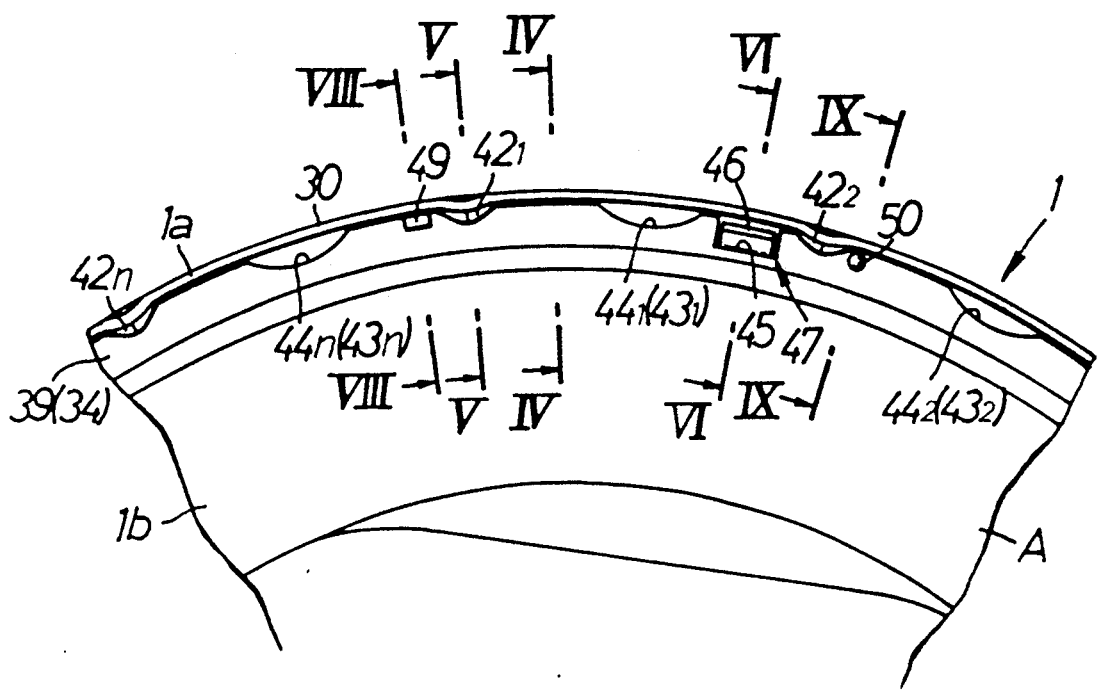
FIG. 2 is a view taken in a direction an arrow II in FIG. 1.
Figure 5:
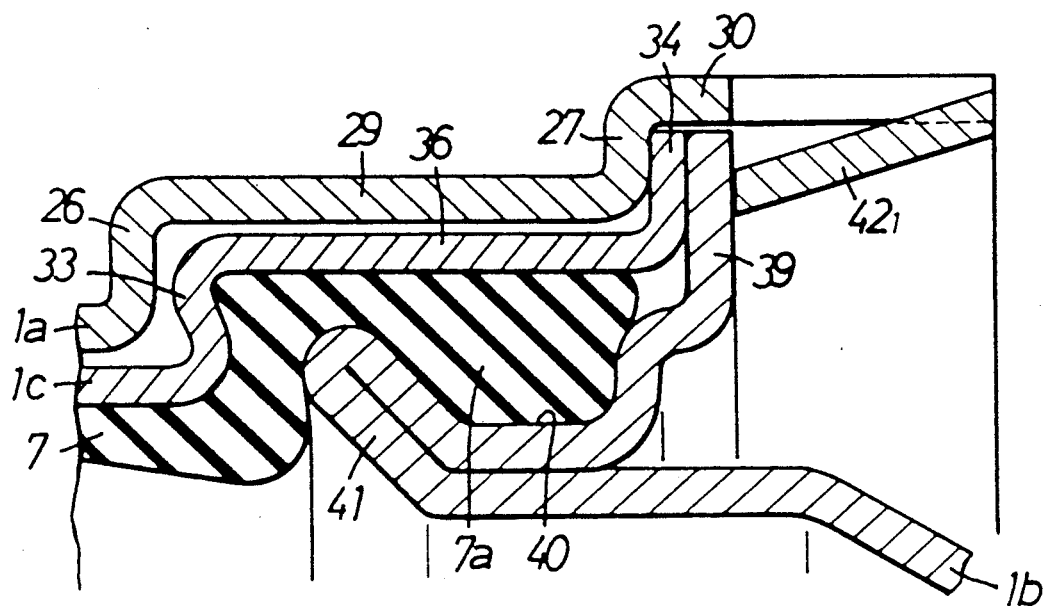

As shown in FIGS. 2 and 5, the third cylindrical portion 30 has a number of locking claws $42_1, 42_2 \text{ - - - } 42_n$ formed thereon at circumferentially equal distances by cutting and raising the cylindrical portion 30 radially inwardly. The claws are capable of clamping the first and second flanges 34 and 39 to the third step 27 by engagement with a back face of the second flange 39. The position of the flanges 34 and 39 at this time is referred to as an assembled position A.

On the other hand, the first and second flanges 34 and 39 superposed on one another have notches $43_1, 43_2 \text{ - - - } 43_n$ and $44_1, 44_2 \text{ - - - } 44_n$, of the same number as the locking claws $42_1, 42_2 \text{ - - - } 42_n$, provided at their peripheral portions corresponding to the claws $42_1, 42_2 \text{ - - - } 42_n$. Thus, if the phase positions of the notches $43_1, 43_2 \text{ - - - } 43_n$ and $44_1, 44_2 \text{ - - - } 44_n$ and the locking claws $42_1, 42_2 \text{ - - - } 42_n$ are aligned with each other, the locking claws $42_1, 42_2 \text{ - - - } 42_n$ can be passed through the notches $43_1, 43_2 \text{ - - - } 43_n$ and $44_1, 44_2 \text{ - - - } 44_n$. The position of the flanges 34 and 39 at this time is referred to as a disassembled position D.

Figure 6:
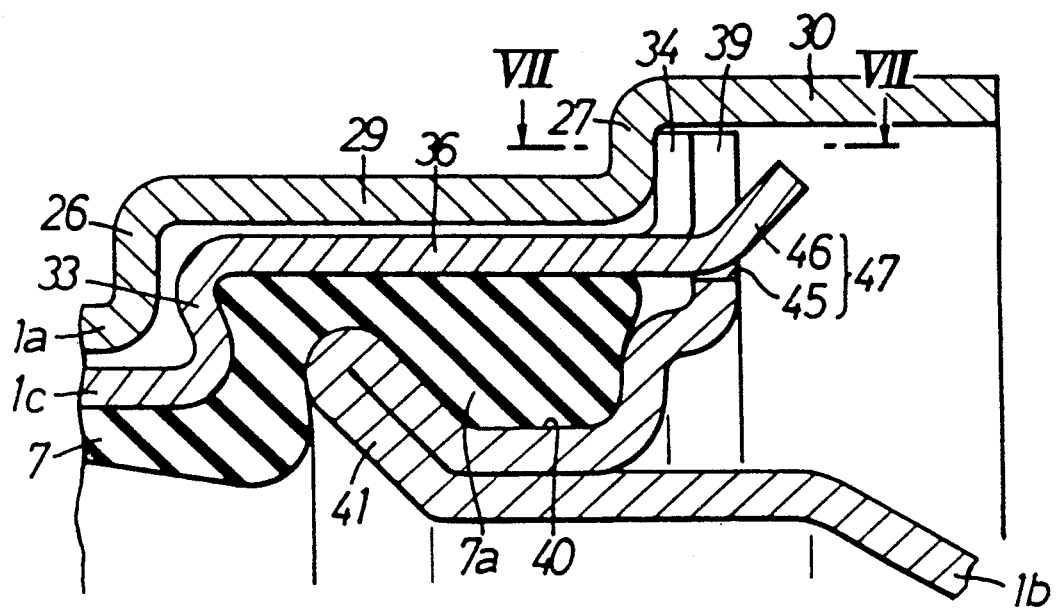
Figure 7:
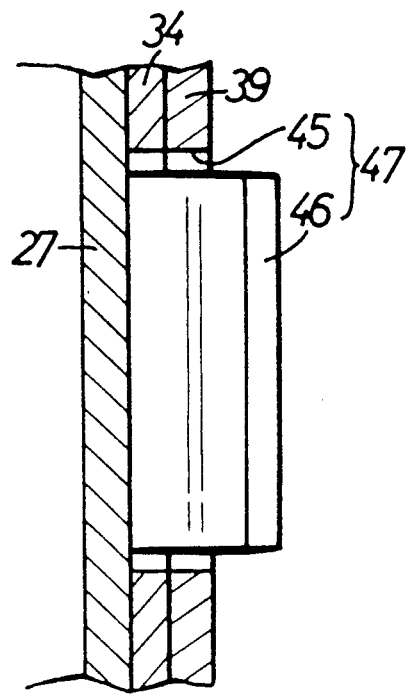
FIG. 7 is a sectional view taken along a line VII—VII in FIG. 6.

As shown in FIGS. 2, 6 and 7, the second flange 39 also has a positioning notch 45 provided between the adjacent locking claw $42_2$ and notch $43_1$ when the second flange 39 occupies the assembled position A, and a projecting piece 46 is connected to a rear end of the sixth cylindrical portion 36 and adapted to be passed through and engaged in the positioning notch 45. The projecting piece 46 is formed by felling of the first flange 34. The positioning notch 45 and the projecting piece 46 constitute positioning means 47 by engagement with each other, which makes it possible to provide the alignment in phase position of the notches $43_1, 43_2 \text{ - - - } 43_n$ and $44_1, 44_2 \text{ - - - } 44n$ of the flanges 34 and 39.

The projecting piece 46 is warped radially outwardly as leading rearwardly.

Figure 8:
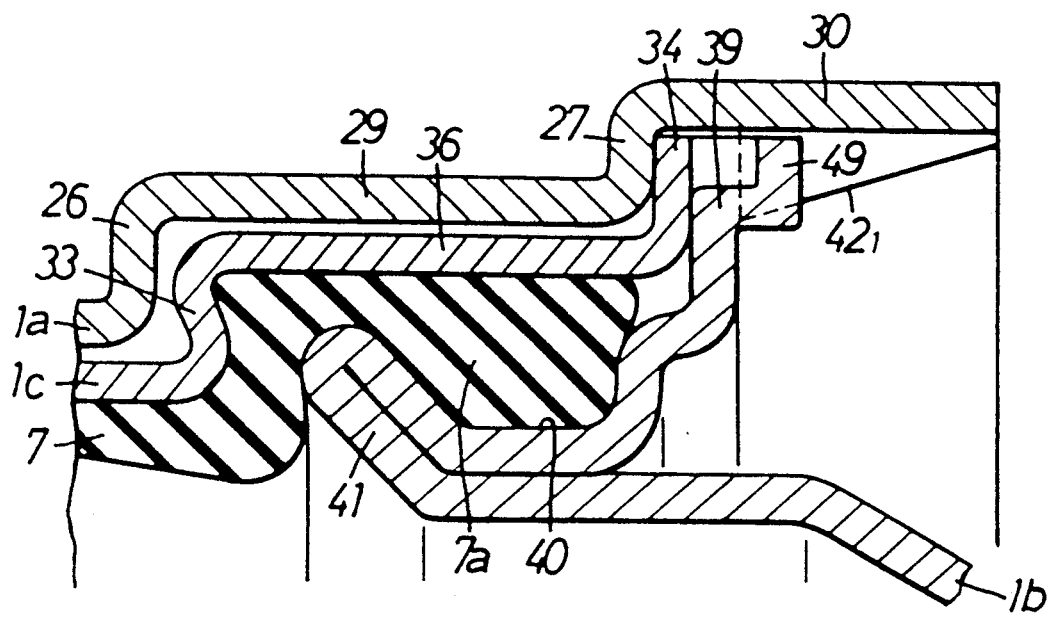
FIGS. 8 and 9 are sectional views taken along lines VIII—VIII and IX—IX in FIG. 2, respectively.
Figure 9:
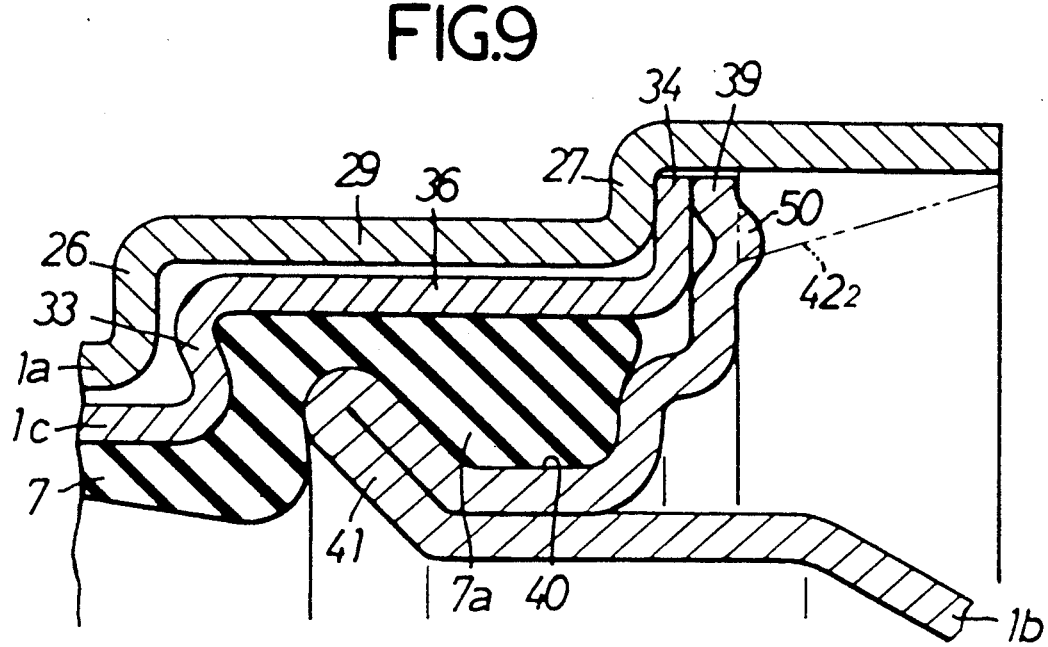

Further, as shown in FIGS. 2, 8 and 9, the second flange 39 is formed with a first 49 and a second projection 50. The first projection 49 is intended to abut against a predetermined one of the locking claws, e.g., $42_1$ at the assembled position A of the second flange 39 to prevent the rotation of the second flange more than required, and to assure such prevention, a wall of the projection 49 rises at a right angle from the back face of the second flange 39.

On the other hand, the second stop projection 50 is intended to abut against a locking claw, e.g., $42_2$, other than the predetermined locking claw $42_1$ at the assembled position A of the second flange 39 to provide a resistance to the rotation of the second flange 39 toward the disassembled position D, and has a side wall rounded to permit passing of such locking claw $42_2$ when the projection 50 has been subjected to a load larger than a given value from such locking claw $42_2$.

The operation of this embodiment will be described below. In assembling the booster shell 1, first, the rear shell half 1b with the outer peripheral bead 7a of the rear diaphragm 7 mounted in the annular groove 40 is fitted to the partition wall plate 1c with the outer peripheral bead 5a of the rear diaphragm 5 mounted in the annular groove 37, thereby causing the first and second flanges 34 and 39 to be superposed one on another, while permitting the projecting piece 46 to be passed through the positioning notch 45 into engagement in the latter.

In this case, because the projecting piece 46 is inclined as described above with its leading end spaced from the outer peripheral bead 7a of the diaphragm 7, the outer peripheral bead 7a cannot be damaged by the leading end of the projecting piece 46 during such fitting.

Figure 3:
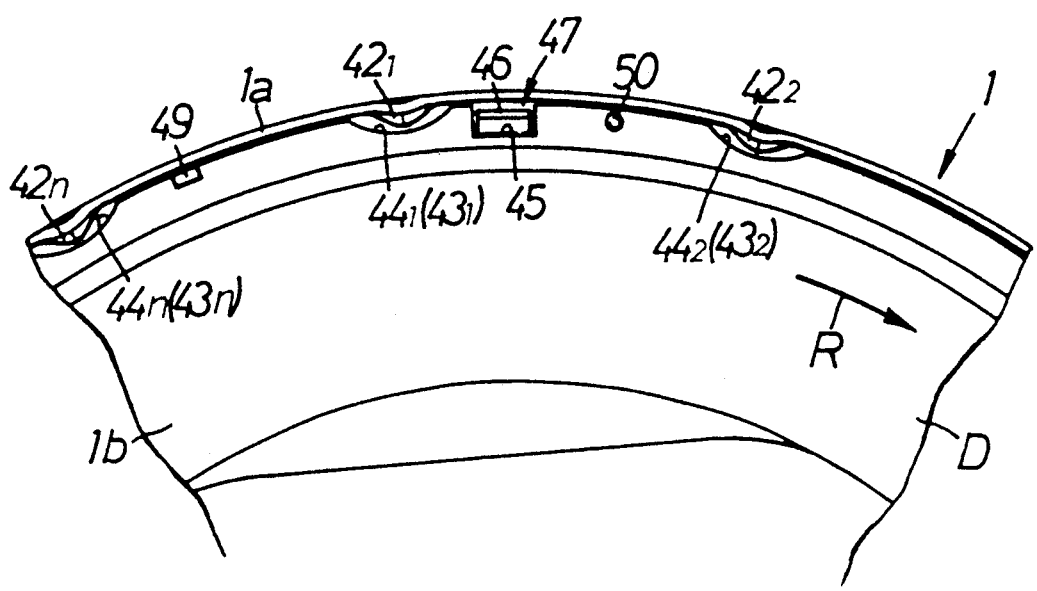
FIG. 3 is an illustrative view similar to FIG. 2, but before assembling.
Figure 4:
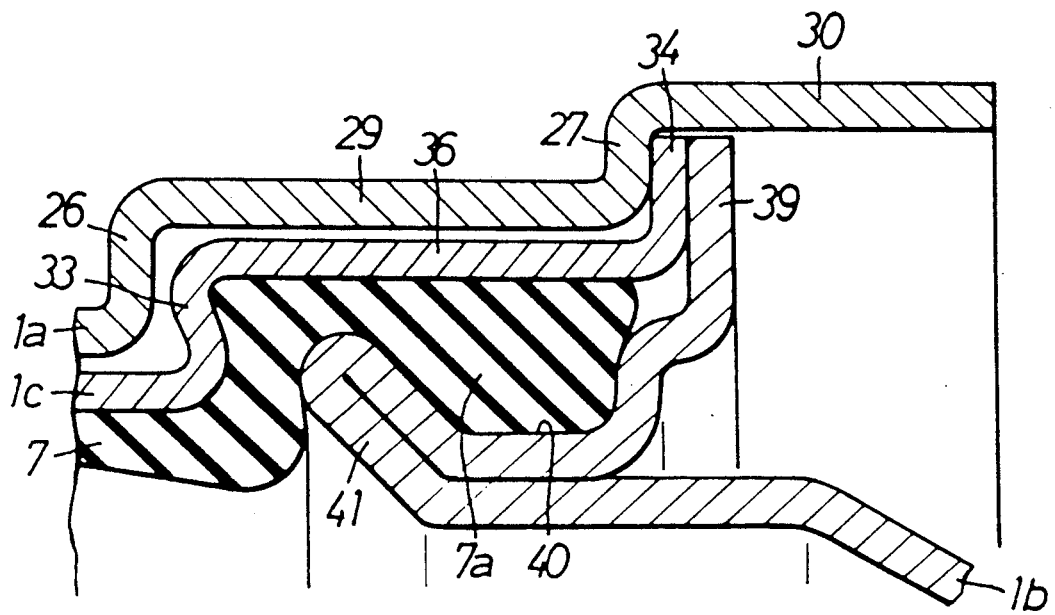
FIGS. 4, 5 and 6 are sectional views taken along lines IV—IV, V—V and VI—VI in FIG. 2, respectively.

Then, as shown in FIG. 3, the partition wall plate 1a and the rear shell half 1b are fitted to the front shell half 1a in the disassembled position D in which the notches $43_1, 43_2 \text{ - - - } 43_n$ and $44_1, 44_2 \text{ - - - } 44_n$ of the first and second flanges 34 and 39 are aligned with the locking claws $42_1, 42_2 \text{ - - - } 42_n$. Then, with the first flange 34 allowed to abut against the third step 27 of the front shell half 1a, the rear shell half 1b is rotated relative to front shell half 1a in a direction of an arrow R in FIG. 3, i.e., toward the assembled position A. During this time, the partition wall plate 1c is rotated in unison with the rear shell half 1b, because it has been in engagement in the positioning notch 45 of the second flange 39. In this case, even if the projecting piece 46 and the second flange 39 have a smaller thickness, the abutting areas thereof are relatively large and hence, the surface pressure during such rotation can be reduced, because the projecting piece 46 diagonally intersects the second flange 39 within the positioning notch 45.

When with the rotation of the rear shell half 1b in the direction R, the locking claw $42_2$ approaching the second stop projection 50 has passed over the second stop projection 50 and ultimately, the rear shell half 1b has reached the assembled position A, another locking claw $42_1$ immediately abuts against the first stop projection 49 to prevent the rotation of the rear shell half 1b more than required and hence, the locking claw $42_2$ having passed over the second stop projection 50 cannot be led to bump against the projecting piece 46 of the positioning means 47.

Thus, the first and second stop projections 49 and 50 are capable of retaining the shell halves 1a and 1b in the assembled position A by clamping the plurality of locking claws $42_1$ and $42_2$ therebetween and therefore, capable of reliably clamping and locking the first and second flanges 34 and 39 to the third step 27 by all the locking claws $42_1, 42_2 \text{ - - - } 42_n$.

Even after assembling, the engagement between the positioning notch 45 and the projecting piece 46 can be observed from the rear of the rear shell half 1b and hence, it is possible to judge the alignment and misalignment of the phases of the flanges 34 and 39 from such engagement condition.

The disassembling of the booster shell 1 is achieved by reversely conducting the above-described operation. In this case, the locking claw $42_2$ is somewhat deformed due to its repassage over the second stop projection 50, but no deformation is produced in another locking claw $42_1$ opposed to the first stop projection 49. Therefore, even during reassembling, the rear shell half 1b can be reliably stopped in the predetermined assembled position A by abutment of the locking claw $42_1$ against the first stop projection 49.

It should be noted that in assembling in a manufacture factory, the partition wall plate 1c and the rear shell half 1b may be fitted to the front shell half 1a prior to the formation of the locking claws $42_1, 42_2 \text{ - - - } 42_n$ on the third cylindrical portion 30 of the front shell half 1a, and then, the locking claws $42_1, 42_2 \text{ - - - } 42_n$ may be formed on the third cylindrical portion 30, as shown in FIG. 2.

What is claimed is:

1. A tandem type vacuum booster comprising a booster shell which is comprised of a front shell half formed into a bottomed cylindrical shape with a rear end thereof opened, a rear shell half which closes the opened end of said front shell half, and a partition wall plate clamped between both said shell halves for dividing a chamber between both said shell halves into a front shell chamber and a rear shell chamber; a front diaphragm having an outer peripheral bead clamped between the front shell half and the partition wall plate; and a rear diaphragm having an outer peripheral bead clamped between the partition wall plate and the rear shell half; said front shell half being provided at its rear end with an annular radially outwardly extending step and a cylindrical portion extending rearwardly from an outer periphery of the step, said partition wall plate and said rear shell half having a first and a second flange provided thereon respectively, which flanges are superposed one on another within said cylindrical portion and rotatable between a disassembled position and an assembled position, each of the flanges having a number of notches circumferentially arranged along a peripheral edge thereof, said flanges being connected to each other through a positioning means so that their notches are aligned with each other, said cylindrical portion being provided with a number of locking claws which are aligned with the notches in the disassembled position of the flanges to enable engagement and disengagement of the flanges with and from the cylindrical portion and which clamp the flanges to the step in the assembled position, wherein said second flange is formed with a first stop projection and a second stop projection, the first stop projection being adapted to abut against a predetermined one of the locking claws to stop the flanges at the assembled position before the locking claws interfere with the positioning means during rotation of the flanges to the assembled position, and said second stop projection permitting passing thereover of a locking claw other than said predetermined locking claw during rotation of the flanges toward the assembled position, but coming into abutment against such other locking claw to resist the rotation of the flanges back to the disassembled position when the flanges have reached the assembled position.

2. A tandem type vacuum booster according to claim 1, wherein said locking claws are formed by cutting and raising parts of the cylindrical portion radially inwardly.

3. A tandem type vacuum booster according to claim 1 or 2, wherein said first stop projection has a side wall raised at a right angle from a back face of the second flange to ensure that said flanges are reliably stopped at the assembled position.

4. A tandem type vacuum booster according to claim 3, wherein said second stop projection has a side wall rounded to permit the passing of said other locking claw over said second stop projection when the second stop projection is subjected to a load of more than a predetermined value from said other locking claw during rotation of said flanges toward the assembled position.

* * * * *